United States Patent
Leclerc

(10) Patent No.: US 7,147,070 B2
(45) Date of Patent: Dec. 12, 2006

(54) MOTORIZED SEMI-TRAILER

(76) Inventor: Gaétan Leclerc, 112, rue du Lotier, St-Augustin-de-Desmaure, QC (CA) G3A 2N8

( * ) Notice: Subject to any disclaimer, the term of this patent is extended or adjusted under 35 U.S.C. 154(b) by 0 days.

(21) Appl. No.: 10/771,098

(22) Filed: Feb. 3, 2004

(65) Prior Publication Data
US 2005/0000739 A1 Jan. 6, 2005

(51) Int. Cl.
*B62D 59/04* (2006.01)
*B62D 53/00* (2006.01)
*B60K 6/00* (2006.01)

(52) U.S. Cl. .................. 180/14.2; 180/14.3; 180/65.2; 180/65.3; 180/65.4

(58) Field of Classification Search .............. 180/65.2, 180/65.3, 65.4, 14.2, 14.3, 14.7, 14.4, 6.5, 180/235, 243
See application file for complete search history.

(56) References Cited

U.S. PATENT DOCUMENTS

| | | | | |
|---|---|---|---|---|
| 3,860,081 A | * | 1/1975 | Moll et al. | 180/14.3 |
| 4,685,527 A | * | 8/1987 | Oswald et al. | 180/14.3 |
| 4,762,191 A | * | 8/1988 | Hagin et al. | 180/14.2 |
| 5,147,003 A | * | 9/1992 | De Monclin | 180/14.2 |
| 5,178,403 A | * | 1/1993 | Kemner et al. | 280/423.1 |
| 6,367,570 B1 | * | 4/2002 | Long et al. | 180/65.2 |
| 6,419,037 B1 | * | 7/2002 | Kramer et al. | 180/14.2 |
| 6,516,925 B1 | * | 2/2003 | Napier et al. | 188/112 A |
| 2002/0056579 A1 | * | 5/2002 | Cooper | 180/14.2 |

FOREIGN PATENT DOCUMENTS

EP 0040111 * 4/1981

* cited by examiner

*Primary Examiner*—Lesley D. Morris
*Assistant Examiner*—Marc A. Scharich
(74) *Attorney, Agent, or Firm*—Eric Fincham

(57) ABSTRACT

An improved tractor trailer having a tractor unit and a trailer unit and wherein the tractor unit includes an internal combustion engine, the improvement comprising an electrical drive arranged to drive at least some of the wheels on at least one of the axles of the trailer, in a control system associated therewith. The arrangement provides extra power for situations where it is required and can, in the case of electric drive motors mounted directly on the wheel, provide for better braking.

4 Claims, 1 Drawing Sheet

MOTORIZED SEMI-TRAILER

The present invention relates to the field of transportation and more particularly, relates to improvements in a semi-trailer designed to be hauled by a tractor unit.

The use of motorized vehicles for the transportation of goods has been known for a number of years and various standard vehicle configurations have evolved. In the field of trucking, a standard arrangement used is that of a tractor along with at least one trailer pulled thereby. On occasion, more than one trailer will be pulled in a configuration often referred to as a tractor train.

In all configurations known to applicant, the cab portion has the motor and the braking system. Hydraulic and air lines are supplied to the trailer portion for braking purposes.

While the above system is conventional and has operated with minor changes for many years, it is always desirable to have a system which can operate more efficiently and reduce fuel costs. A reduction of fuel consumption would also reduce gas emissions which in turn will help obviate the accompanying greenhouse effect.

The trucking industry is an important one in North America as evidenced by the number of tractor trailers constantly on the roads. However, tractor trailers take a substantial toll on the highways due to their weight and also generate a great deal of pollution. Furthermore, they are frequently implicated in accidents. These accidents often occur as a result of speed differentials between tractor trailers and other vehicular traffic. In order to overcome this, governmental authorities have implemented various actions such as adding passing lanes on ascents, providing vehicle safety verification areas, paving road shoulders, etc. All these actions cost a great deal of money.

In order to provide the tractor units with sufficient power to pull a load on an ascent, the engine of the tractor unit must be sufficiently large. However, this same size engine is not required on level ground. The engine will then tend to operate less efficiently resulting in poorer fuel mileage.

It is an object of the present invention to provide an arrangement wherein the fuel consumption of a motorized semi-trailer may be reduced.

It is a further object of the present invention to provide a drive system wherein the safety of vehicle is enhanced.

According to one aspect of the present invention, there is provided in improvement in a tractor trailer having a tractor unit and a trailer unit, and wherein the tractor unit includes an internal combustion engine, the trailer unit having a plurality of axles each having wheels thereon, the improvement comprising means for driving the wheels on at least one of the axles, and a control system for operating the means for driving the wheels.

Use of the present invention will result in a reduction of the use of hydrocarbon fuels and accordingly substantially reduce greenhouse gas emissions. In addition, there will be a greater safety factor as the use of the electric motors as brakes is desirable and presents substantial advantages in terms of noise reduction. Therefore, there will be an improvement in the ability of the vehicle to safely brake.

A still further advantage of the system of the present invention is that under difficult conditions, such as snowy or icy roads, additional traction is provided.

According to one embodiment of the present invention, there is provided a partially motorized semi-trailer which is attached to a conventional tractor or cab.

According to the present invention, the semi-trailer is provided with driven wheels which may be used under certain predetermined circumstances or conditions. Preferably, the wheels are driven by electrical means—i.e. an electric motor such as known in the art with the use of hybrid vehicles.

According to the invention, there is provided a trailer, which may be of any desired configuration, having one or more electric motors. There are also provided, either with the trailer or the tractor, rechargeable batteries such as are known in the art and a motor or turbine permitting the recharging of the batteries while moving.

The means for charging the batteries may consist of any of those known in the art and to this end, electric motor brakes (known as regenerative braking) which will recharge the batteries when the trailer is braking may be utilized. Naturally, other conventional and non-conventional sources may be used—i.e. fuel cells, and the like. Likewise, the batteries can be charged by the vehicle engine and or a separate motor. The tractor unit could also be a hybrid unit. The batteries can be mounted on either the tractor or trailer or both.

The trailer will be provided with means for controlling the power and detectors may be utilized to automatically activate the electric motors for acceleration or deceleration. A manual system may also be incorporated.

The practice of the present invention would provide increased security as it would increase the braking capacity and downhill deceleration capability of the vehicle. On the other hand, it would also increase the uphill acceleration capability. This can be important as it would help reduce dangerous situations which arise when a trailer is forced to travel slowly up a non-divided highway. Also, since there would be extra power going uphill, the driver would not need to attempt to attain unreasonable downhill speeds in order to facilitate the next ascent.

As aforementioned, there would be provided suitable control circuits and detectors which could be utilized to automatically activate the electric motor or motors in order to accelerate or decelerate. Thus, detectors could be used for the degree of inclination, speed loss, braking, speed increase, etc. The control circuit could also be tied into the normal braking controls of the vehicle.

The arrangement would also reduce fuel consumption which would contribute to lower transportation costs and lower gas emissions.

Many of the details of the generator and regenerative braking are not included herein as they are known in the art. Thus, such a system may be seen in U.S. Pat. No. 6,318,487, the teachings of which are hereby incorporated by reference.

Having thus generally described the invention, reference will be made to the accompanying drawings illustrating an embodiment thereof, in which.

Figure 1:
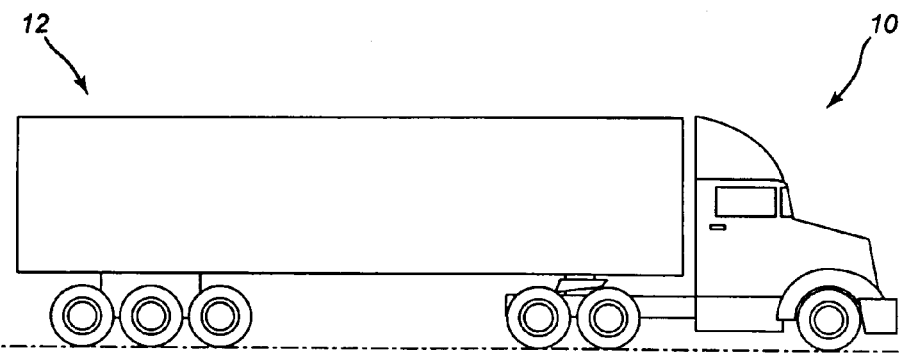
FIG. 1 is a schematic side elevational view of a tractor trailer rig.
Figure 2:
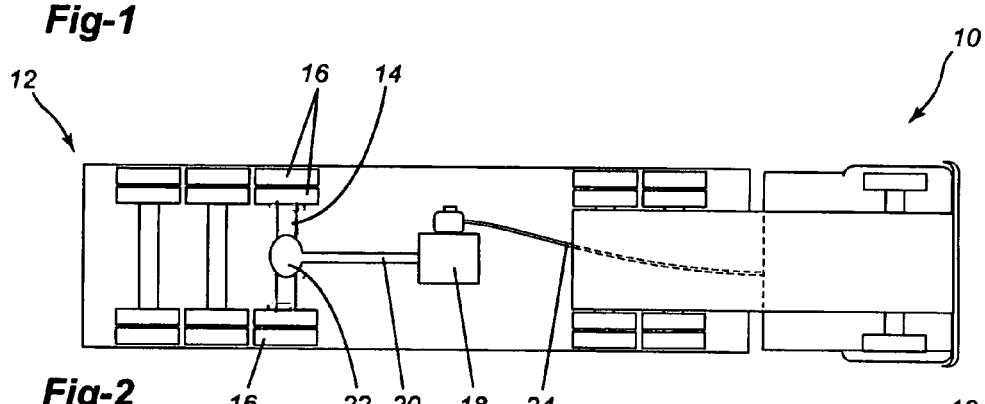
FIG. 2 is a schematic plan view showing one embodiment of the electric drive assembly.

Referring to the drawings in greater detail and by reference characters thereto, there is illustrated in FIG. 1 a tractor trailer rig which consists of a tractor unit generally designated by reference numeral 10 and a trailer unit generally designated by reference numeral 12. Either way a specific configuration is shown, it will be understood that any number of known configurations may be utilized. Thus, there is illustrated a unit having six axles; fewer or more may be employed as conventional in the art The trailer unit has axles 14 with wheels 16 mounted thereon. In a first arrangement illustrated in FIG. 2, there is provided an electric motor generally designated by reference numeral 18. Electrical motor 18 is used to drive a drive shaft 20 which in turn is connected to a differential 22. From differential 22, wheels 16 are driven. As illustrated schematically, a cable 24 extends to a control circuit in tractor unit 10.

Figure 3:
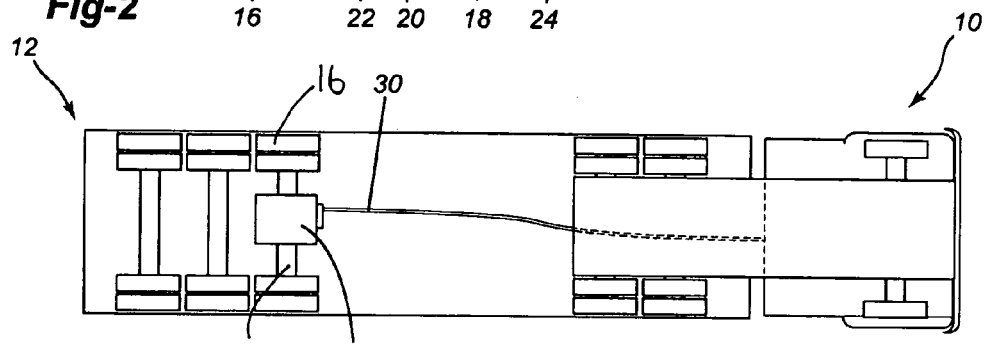
FIG. 3 is a schematic plan view illustrating a variant thereof.

In an alternative arrangement illustrated in FIG. 3, an electric motor 28 is mounted directly on axle 14 to drive wheels 16. Again, a cable 30 extends to a control circuit in tractor unit 10.

Figure 4:
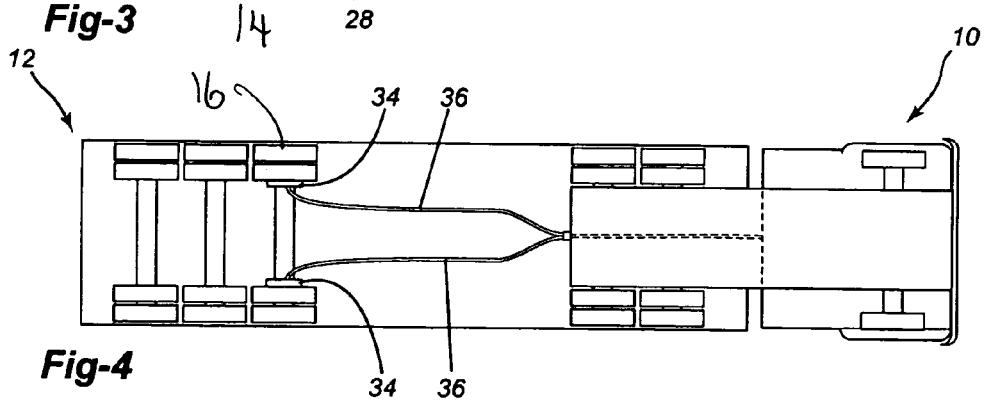
FIG. 4 is a schematic plan view illustrating a still further variant thereof.

In the arrangement of FIG. 4, there is provided electric motors 34 on each wheel, and which motors 34 directly drive each individual wheel 16. As in the previous arrangement, there are provided cables 36 extending to a control circuit in tractor unit 10.

With respect to a control system, such arrangements are known in the arts. Such a system is shown in, for example, U.S. Pat. No. 5,418,437, which is incorporated herein by disclosure.

It will be understood that the above described embodiment are for purposes of illustration only and that changes and modifications may be made thereto without departing from the spirit and scope of the invention.

The embodiments of the invention in which an exclusive property or privilege is claimed are defined as follows:

1. In a tractor trailer having a tractor unit with drive wheels and a trailer unit, and wherein said tractor unit includes an internal combustion engine, the improvement wherein said internal combustion engine is operative to directly drive said drive wheels, said trailer unit having a plurality of axles each having wheels thereon, electric drive means for driving the wheels on at least one of said axles, batteries operatively connected to said electric drive means, said batteries being mounted on said tractor unit, a generator for charging said batteries and a control system for selectively operating said electric drive means.

2. The improvement of claim 1 wherein said electric drive means comprise electric motors associated with said wheels on a plurality of axles.

3. The improvement of claim 2 wherein said electric motors include regenerative braking capability.

4. The improvement of claim 1 wherein said electric drive means comprise a plurality of electric motors, each electric motor being operative to drive a single wheel of said trailer unit.

* * * * *